United States Patent Office 3,664,839
Patented May 23, 1972

3,664,839
MULTIPLE SCINTILLATOR LAYERS ON
PHOTOGRAPHIC ELEMENTS
Evan Thomas Jones, Rochester, N.Y., assignor to
Eastman Kodak Company, Rochester, N.Y.
No Drawing. Filed Sept. 16, 1969, Ser. No. 858,501
Int. Cl. G03c 1/92
U.S. Cl. 96—82                    9 Claims

ABSTRACT OF THE DISCLOSURE

Photographic elements containing multiple scintillator layers, wherein one of the layers is a fine-particle-size scintillator layer and at least one other scintillator is a coarse-particle size layer comprising particle sizes of about 0.5 to about 2.0 microns, are found to be very useful in electron-beam recording and playback. The coarse-particle-size layer facilitates easy alignment of the electron beam and is generally removed after the recording operation. The fine-grain layer is retained intact with the image record for read-out of the recorded information.

This invention relates to photographic elements comprising scintillator layers. One aspect of this invention relates to a photographic element comprising at least one layer containing fine particles of a scintillator and at least one layer containing coarse particles containing a scintillator. In another aspect, this invention relates to a removable scintillator layer coated adjacent another scintillator layer which is permeable to aqueous solutions but will not be washed off during photographic development processes. Another aspect of this invention relates to means for positioning an electron beam with respect to the recording material.

It is known in the art to make homogenous scintillator layers of a hydrophobic vehicle in combination with a hydrophobic scintillator material which generally provides a water-impermeable scintillator layer. It is also known in the art to make scintillator layers having organic fluorescing compounds dispersed in polymeric materials which are in turn dispersed in a hydrophilic colloid such as gelatin to provide a water-permeable scintillator layer.

Scintillator layers in the prior art have emphasized a very evenly dispersed scintillator material of very fine particle size or a homogenous layer in order to reduce background noise when used in an electron-recording and read-out process. However, it is very difficult to focus the electron beam to achieve the correct spot size in the presently used systems. Therefore, improved means are desirable to facilitate alignment and focus of the electron beam, whether it be a mechanical means or an adaptation of the recording film.

I have now found a structural arrangement of an electron recording film which will facilitate alignment and achievement of correct spot size with an electron beam recording and playback device. The improved film comprises an electron-sensitive recording film having coated thereon the combination of (1) a water-permeable scintillator layer comprising a very fine-grain, relatively noiseless, scintillator layer with (2) a second removable layer containing a coarse-grain scintillator coated above said water-permeable layer. The fine-grain layer is not removable by the same means as the coarse-grain layer and remains with the electron-sensitive layer to facilitate read-out of the recorded information. The coarse-grain scintillator layer is present during recording for alignment and is then removed before read-out, for example, by dissolving in the processing operation when a silver halide recording material is utilized. Optionaly, in another embodiment, the coarse-grain layer can be located only at the beginning of each roll of recording film to facilitate alignment wherein the layer does not necessarily have to be removable.

In one embodiment of this invention, the fine-grain scintillator layer comprises latex particles of less than about 0.5 micron and preferably from about 0.1 to about 0.2 micron in average diameter.

In another embodiment of the invention, the coarse scintillator layer comprises particles containing organic scintillator compounds wherein said particles have an average diameter of about 1 micron, generally from about 0.5 to 2.0 microns, and preferably of about 0.7 to 1.5 microns.

In another embodiment, the coarse scintillator layer comprises latex particles dispersed in a vehicle of a hydrophilic colloid which can be removed by aqueous solutions, such as a cyano-ethylated derivative of gelatin which is unhardenable with aldehyde-type gelatin hardeners.

In another embodiment, the scintillator in the fine-grain layer is an organic compound having a decay rate in the magnitude of $10^{-7}$ seconds while the coarse scintillator layer can comprise the same scintillator compound or one of the more conventional slower scintillator or phosphorescent compounds, also called organic scintillators or organic fluors which have maximum emission in the range from 350–400 millimicrons. Often a mixture of organic fluorescent compounds can be used. A mixture comprising a primary and a secondary scintillator may be used. Generally, suitable organic fluorescent compounds may be selected, for example, from those described and referred to as "organic fluors" and "organic scintillators" in Organic Scintillation Detectors by E. Schram, R. Lombaert, Elsvier Publishing Co., 1963. For use in electron-beam read-out applications, I prefer a scintillator having very rapid luminescent decay and for this purpose I prefer a compound selected from oxazole and oxadiazole scintillators having structures of the class shown below:

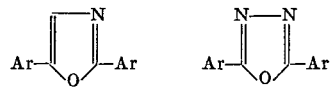

wherein Ar is a radical comprising an aromatic nucleus. Usually the preferred concentration of organic scintillator in fluorescent coatings of this type will be in the range from about 0.2 percent to about 10 percent by weight, based on the weight of the solid solution carrier. The preferred ratio of solid solution carrier to the gelatin in the coatings usually will be in the range from about 3:1 to about 5:1. High concentrations of fluorescent compound in the coated layer give an excellent fluorescent coating in practice with good quantum yields.

The fine-grain scintillator layer generally comprises a hydrophilic colloid vehicle including the various gelatins and other water-permeable-film-forming materials such as other protein derivatives, e.g., casein, and various synthetic resins of the class capable of forming a water-permeable film layer coated for aqueous medium. For example, instead of gelatin I may substitute cellulose and other polysaccharide derivatives such as described in U.S. Pats. 2,964,405 and 2,448,538, and various vinyl polymers such as those described in U.S. Pats. 2,376,371, 2,414,207 and 3,062,674. A wide variety of hydrophilic film-forming colloids are useful as substitutes for gelatin in my invention.

In one embodiment, solid-solution carriers selected from water-insoluble resins, latex copolymers and organic solids that form solid solution with the selected fluorescent compounds are mixed or formed in combination with the fluorescent compound before utilization in the scintillator layer.

Preferably, such solid-solution carries have refractive indexes close to that of gelatin, and I especially prefer solid-solution carriers that also improve the quantum output of the organic scintillator compounds with which they are combined in solid solution. Generally, polymers of styrene and copolymers of styrene with lower alkyl acrylates, in proportions ranging from about 20:80 to about 80:20, are suitable; I prefer polymers and copolymers of this type having molecular weights in the range corresponding to inherent viscosities, measured in acetone, from about 0.4 to about 1.5. Other synthetic resins having distinctive aromatic character and in this molecular weight range may be used. I can use, for example, polyvinyl benzoate. Preferred latex copolymers referred to herein generally are a copolymer of a water-insoluble monomer with small numbers of units of a water-soluble monomer, such as acrylic acid, whereby the copolymer is easier to disperse in the form of small particles.

The fine-grain scintillator layers can be made by any general process known in the art for making scintillator layers for electron-recording elements. However, the fine-grain scintillator layers are preferably made by incorporating an organic fluor in a hydrophobic polymeric vehicle, usually by use of a mutual solvent, and then homogenizing the mixture to obtain very small particle size and dispersing the mixture in a hydrophilic colloid vehicle. Typical useful processes are generally disclosed in Heidke, U.S. Ser. No. 563,678, now U.S. Pat. 3,513,102; Trevoy, U.S. Pat. 3,245,833 issued Apr. 12, 1966; Trevoy, U.S. Pat. 3,428,451 issued Feb. 18, 1969; Millikan, U.S. Pat. 3,418,127 issued Dec. 24, 1968; and Oetiker, U.S. Pat. 3,406,070 issued Oct. 15,1968.

The coarse-grain layer can be made by the same procedure as the fine-grain layer, except the mixture of the organic fluor and the hydrophilic polymer is not homogenized to as small a particle size. The coarse particles have a particle size of about 1 micron, generally within the range of 0.5 to 2 microns and preferably from 0.7 to 1.5 microns. Particle sizes larger than 2 microns are not desirable as they can produce a pattern of the aggregate material in the recording layer.

The coarse-grain scintillator material is incorporated in a vehicle which is generally soluble or highly swellable in aqueous solutions to allow removal of the layer. In one embodiment typical hydrophilic colloids are used, such as cyanoethylated gelatin as disclosed in U.S. Pat. 2,518,666, cellulose ether phthalates as disclosed in U.S. Pat. 3,020,155 issue Feb. 6, 1962, vehicles as disclosed in U.S. Pat. 2,725,293, polyvinyl alcohol, polystyrene sulfonic acid as disclosed in British Pat. 1,000,116 published Aug. 4, 1965, and the like; the coarse-particle-size layers made with most of the above vehicles will wash off during processing of the element, for example, when processed at 95° F.

When it is desired to make the coarse-particle layer removable, anti-hardeners can be incorporated into this layer, especially when gelatin is present in the layer. Typical compounds of this type are disclosed in British Pat. 1,042,009 published Sept. 7, 1966.

Since the fine-particle scintillator layer is permanent and is generally not removed from the element, it is often desirable to incorporate non-wandering hardeners in this layer. This avoids any substantial hardening of the adjacent coarse-particle-size layer which is to be removed later. Typical non-wandering hardeners include those disclosed in Kunz, U.S. Pat. application 682,494 filed Nov. 13, 1967 now abandoned, corresponding to Belgian Pat. 723,805 issued Jan. 15, 1969. Also, interlayers can be used to separate the permanent fine-particle-size layer from the coarse-particle-size layer to mitigate the effects of wandering hardeners and to facilitate easy removal of the outer layer.

The particle size used herein refers to the size of the suspended polymeric particle in the carrier vehicle. The polymeric particles dispersed in the vehicle are somewhat representative of a latex dispersion or colloidal dispersion. The size of the suspended particle can be determined by direct measurement on on electronphotomicrograph. The fluorescing material, commonly referred to as the organic scintillator, is generally uniformly dispersed throughout the solid-solution carrier and appears as a combined aggregate particle in the photomicrographs, especially when utilizing organic fluorescing compounds.

In various embodiments, fluorescent coatings of the invention may be coated on a variety of supports. In photographic embodiments, the fluorescent coating may be on any of the various film, paper and plate supports of the kinds used in photographic elements, e.g., cellulose ester and other polyester film supports, various paper and foil and coated paper supports, glass and other rigid plates, self-supporting photosensitive films, and the like.

The position of the fluorescent layers may be either over or under the radiation-sensitive recording layer on the same side of the support. Further, the fluorescent layers may be positioned on the side of the support opposite the recording layer. In some embodiments I may use more than two fluorescent layers, for example, in radiation-sensitive elements having a radiation-sensitive coating on each side of the support.

The invention contemplates fluorescent layers of the kind described which in addition may contain other functional components. For example, the fluorescent layer may further comprise photosensitive silver halide grains dispersed in the continuous phase of the emulsion, so that the layer is also functional as a photographic recording layer as well as being fluorescent. In still further embodiments, the fluorescent layer may contain pigments, hardeners, color-forming components, etc., in addition to the components essential to the fluorescent layers as described above.

The elements of this invention can also contain conducting layers. Layers of this type are especially advantageous when recording electron beams. Typical useful conducting layers can be made of vaporized metals, layers containing cuprous iodine such as, for example, layers containing cuprous iodide dispersed therein, or subbing layers impregnated with solutions of cuprous iodide. Typical useful conducting layers have a surface resistivity of less than $10^{11}$ ohms per square as measured by the procedure set forth in Trevoy, U.S. Pat. 3,245,833 issued Apr. 12, 1966. In one embodiment, a preferred conducting layer comprises a sub-layer of a terpolymer of methyl acrylate, acrylonitrile, vinylidene chloride and acrylic acid which has been imbibed with a cuprous iodide solution. Conducting layers of this type can generally be made as disclosed in Gramsa and Stahley, U.S. Ser. No. 717,386 filed Mar. 29, 1968, corresponding to Belgian Pat. 730,715 issued May 30, 1969.

The information-recording layer can generally be any material used for electron-beam recording. Preferred materials for recording electron-beam exposure include direct-positive silver halide emulsions as disclosed in Brooks, Spayed and Jones, U.S. Ser. No. 558,585 filed June 20, 1966, corresponding to U.S. Pat. 3,510,348 issued May 5, 1970, silver halide emulsions as disclosed in Trevoy, U.S. Pat. 3,428,451 issued Feb. 28, 1969, and the like.

The invention can be further illustrated by the following example.

EXAMPLE

Part A

An electron-recording element having a fine-grain scintillator layer is made by the following procedure. Cuprous iodide (2.4 g.) is dissolved in a mixture of 200 ml. methyl ethyl ketone and 4.0 ml. of trimethyl phosphite; then 40 ml. of a 5 percent solution of a terpolymer poly(methylacrylate-vinylidene chloride-itaconic acid) in 90 percent methyl ethyl ketone and 10 percent cyclohexanone is added. The solution is filtered and then machine-coated by bead application on a subbed polyester film support to give a coverage of 5 mg. of copper per square foot. The coating is dried at 110° C. and then cured at 120° C. for 10 minutes. The coating is clear and surface resistivity is $1.7 \times 10^5$ ohms per square. A protective layer of Vinylite VMCH (TM) is solution-coated from a ketone solvent over the conducting layer. This protective coating is dried at 95° C. and cured at 100° C. for 4 minutes. Over this protective layer, a thin subbing of cellulose nitrate (from a 1.4 percent solution in methanol) is applied to improved adhesion. A gelatin subbing is applied and a gelatin-silver halide photographic emulsion of the direct-positive type is coated over the subbing.

A fluorescent coating is coated over the sensitive layer of silver halide as follows. An emulsion of water-insoluble particles of organic solution dispersed in aqueous gelatin solution is prepared by the dissolution in 109 ml. of ethyl acetate of 17.0 g. of a copolymer of 70 percent butyl acrylate, 30 percent styrene having inherent viscosity estimated at about 0.5 to 0.6 as would be measured in acetone, and 1.85 g. of 3-phenyl-7-ureidocourmarin (described in Example 3 of British Pat. 786,234). After the ingredients are all dissolved, the solution is stirred at 45° C. into 200 ml. of 10 percent aqueous gelatin solution which also contains 11.1 ml. of 13.1 percent aqueous Alkanol B. (TM) (propylated naphthalene sulfonate) solution and 10 ml. of ethyl acetate. The mixture is then dispersed for 2 minutes in a high-speed mixer to disperse thoroughly fine particles of the organic solution in the aqueous medium. The dispersion is then chill-set, noodled and washed thoroughly for 6 hours with water at 5° C. to dissolve out the ethyl acetate. The dispersion is then melted, filtered and coated on an element containing a direct-positive electron-recording silver halide emulsion. The size of the carrier particles, which contain the organic fluor in solid solution, is about 0.2 microns.

Part B

A coarse-grain scintillator layer is made by the same procedure as Part A, except a cyanoethylated "blocked" derivative of gelatin is used in place of gelatin. The cyanoethylated gelatin is prepared by plumping 1 kg. of alkali process gelatin in 7 liters of distilled water overnight. The swollen gelatin is melted at 60° C. The pH is raised to 10 with sodium hydroxide and, with good stirring, 100 g. of acrylonitrile is slowly added. The melt is stirred 4 hours at 40–45° C. and subsequently acidified to pH 6 with sulfuric acid. The melt is strained, chilled, noodled, washed 4 hours in running cold tap water and dried.

The homogenization of the scintillator dispersion in a high-speed mixer is omitted and only mild stirring with a propeller-bladed stirrer is carried out. The dispersion is then chill-set, noodled and washed thoroughly for 6 hours with water at 5° C. This procedure produces a latex dispersion with relatively large latex particles of the average size of about 0.9 micron.

The coarse-grain scintillator mixture is diluted in water with saponin, the pH adjusted to 5.9 and then coated directly above the scintillator layer on the element of Part A.

Samples of the coated film are then exposed in an electron-beam recorder apparatus of the type disclosed by Boblett, U.S. Pat. 3,403,387 issued Sept. 24, 1968. The position of the electron beam with respect to the recording film can readily be determined by measuring the signal on a photomultiplier tube, amplifying it and displaying it on an oscillograph display tube.

The film samples are processed in an Elon-hydroquinone developer at 68° F., the top scintillator layer swells and softens and it is removed by lightly rubbing the element.

The developed film with the coarse-particle layer removed is read-out in an electron-beam read-out procedure. In each instance where the signal noise is optimized during recording, complete reproduction of the recorded information is obtained. Upon examination of the recorded film under a microscope, the trace pattern is substantially centered on the element with excess unexposed film at each edge of the strip remaining.

Similar results can be obtained when using a coarse-particle layer comprising scintillator particles averaging 0.7 micron, 1.2 microns and 1.5 microns. Use of scintillator particles above 2 microns provides high noise for tracking, but produces accompanying reduced exposure patterns in the image layer, apparently as a result of absorption of radiation.

Although the invention has been described in considerable detail with particular reference to certain preferred embodiments thereof, variations and modifications can be effected within the spirit and scope of the invention.

I claim:

1. An improved recording element having a layer sensitive to electromagnetic radiation, the improvement comprising the combination of (1) a discrete fine-grain scintillator layer containing an organic fluorescent and (2) a discrete coarse-grain scintillator layer having an average particle size of organic fluorescent compound of about 0.5 to about 2.0 microns.

2. A recording element according to claim 1 wherein said fine-grain scintillator layer comprises latex particles containing a fluorescent material wherein said latex particles have an average size less than about 0.5 micron.

3. A recording element according to claim 1 wherein said coarse-grain scintillator layer comprises organic fluorescent compounds in a latex having an average particle size of at least about 0.5 micron.

4. A recording element according to claim 3 wherein said coarse-grain layer comprises a binder which is swellable in aqueous solutions to allow separation of said layer from said recording element.

5. A recording element according to claim 1 wherein said layer sensitive to electromagnetic radiation is a direct-positive silver halide layer.

6. A recording element according to claim 1 further comprising a conducting layer.

7. A recording element according to claim 1 wherein said coarse-grain layer comprises a cyanoethylated derivative of gelatin to provide a removable layer.

8. A recording element comprising a support, a layer sensitive to electromagnetic radiation, and the combination of (1) a scintillator layer comprising particles having an average particle size of about 0.1 to about 0.2 microns containing an organic fluorescent compound and (2) a scintillator layer comprising particles having an average particle size of about 0.5 to about 2.0 microns containing an organic fluorescent compound.

9. A recording element as in claim 8 comprising a support, a layer sensitive to electromagnetic radiation which is a direct-positive photographic silver halide layer, and the combination of (1) a scintillator layer comprising particles having an average particle size of about 0.1 to about 0.2 microns containing a fluorescent material comprising an organic fluorescent compound in a hydrophobic polymeric vehicle, said particles dispersed in a hydrophilic colloid, with (2) a scintillator layer comprising particles having an average particle size of about 0.5 to about 2.0 microns containing a scintillator material comprising an organic fluorescent compound in a hydrophilic polymeric vehicle.

References Cited

UNITED STATES PATENTS

| | | | |
|---|---|---|---|
| 1,448,456 | 3/1923 | Levy et al. | 96—82 |
| 3,061,722 | 10/1962 | Mittelstaedt | 250—65 |
| 3,300,311 | 1/1967 | Kennard et al. | 96—82 |
| 3,513,102 | 5/1970 | Heidke | 252—301.2 |

RONALD H. SMITH, Primary Examiner

U.S. Cl. X.R.

340—173